(12) United States Patent
Janevski

(10) Patent No.: US 7,269,338 B2
(45) Date of Patent: Sep. 11, 2007

(54) APPARATUS AND METHOD FOR SYNCHRONIZING PRESENTATION FROM BIT STREAMS BASED ON THEIR CONTENT

(75) Inventor: Angel Janevski, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1435 days.

(21) Appl. No.: 10/014,225

(22) Filed: Dec. 11, 2001

(65) Prior Publication Data

US 2003/0156827 A1  Aug. 21, 2003

(51) Int. Cl.
*H04N 7/00* (2006.01)
*H04N 5/91* (2006.01)
(52) U.S. Cl. .............................. 386/96; 386/80; 386/46; 386/68
(58) Field of Classification Search ................. 386/96, 386/92, 113, 124, 13, 21, 40, 46, 52, 80, 85, 386/68
See application file for complete search history.

(56) References Cited

U.S. PATENT DOCUMENTS 7,072,575 B2 *  7/2006  Kang .......................... 386/125

2003/0120685 A1*  6/2003  Duncombe et al. ......... 707/200

OTHER PUBLICATIONS

William P. Lord, "Synchronized Personal Video Recorders", U.S. Appl. No. 09/894,060, filed Jun. 28, 2001.

* cited by examiner

*Primary Examiner*—Robert Chevalier
(74) *Attorney, Agent, or Firm*—Paul Im

(57) ABSTRACT

Content of multiple digital bit streams with essentially the same renderable content, and situated at mutually remote locations, are played back in unison. First, time is synchronized among the processors that participate in a synchronized viewing session by playing back respective streams. Second, the playbacks are content-wise aligned, by rewinding or fast forwarding, to effect overall a precisely synchronized presentation. The content-wise alignment is achieved by means of a status message between processors that contains information characteristic of the sender's bit stream. If any participant, performs a control function (e.g. rewind, fast forward, stop), all other participants follow synchronously. The processor that initiates the session is deemed the initiator, a role that is thereafter assumed by the participant that has last performed a control function. The initiator directs all participants, at session startup, upon execution of each control function, and periodically, to synchronize their playbacks to that of the initiator, whereby all playbacks are synchronized and maintain in synchronization.

35 Claims, 9 Drawing Sheets

APPARATUS AND METHOD FOR SYNCHRONIZING PRESENTATION FROM BIT STREAMS BASED ON THEIR CONTENT

BACKGROUND OF THE INVENTION

1. Field of the Invention

The present invention relates generally to digital image playback, and more particularly to techniques for synchronizing playback of two or more digital streams based on renderable content of those streams.

2. Description of the Related Art

Personal video recorders (PVRs) are video recording devices that may be used in conjunction with virtually every television broadcast system (e.g. cable, digital cable, satellite, antenna, or combinations thereof), as well as to record from VHS, DVD, Internet sources, etc. PVRs may be programmed to automatically find and record a user's favorite television program or programs so that the user may watch what he or she wants, when he or she wants. Typically, PVRs contain a substantial amount of memory and are capable of recording more than thirty hours of programming. The recorded programming may then be retrieved and viewed by the user as desired.

Current PVR technology allows users to time shift the content of the program being recorded (typically television broadcasts). In other words, a user may record a television broadcast and watch it several hours, or even days, later. Alternatively, a user may decide to record a program and begin watching it a predetermined amount of time after the start of the program so that the user has the ability to skip any commercials that may be dispersed throughout the program. Thus, the user would be watching the program during virtually the same time period as people who are watching the live broadcast. However, given the capability to skip through the commercials, the user of the PVR will watch the same program as someone else in less time.

Notwithstanding the above benefits of PVRs, there are disadvantages associated with their use. For example, many people enjoy watching various programs simultaneously (e.g., sporting events, talk shows or dramas) even though the people may be physically located in different locations. These people will often communicate with each other during the program by other communication means such as the telephone or Internet. Therefore, they are able to discuss the program as the events materialize. However, as people time shift content, they lose the ability to simultaneously watch shows "together" while at their respective locations. Inevitably, the two users will be watching the same program out of synch and therefore one user will know the results of a dramatic scene or sporting event, for example, prior to the other user.

Copending U.S. patent application Ser. No. 09/894,060, entitled "Synchronized Personal Video Recorders", filed Jun. 28, 2001, assigned to the assignee of the instant application, incorporated herein by reference, and not admitted to be prior art by its mention in the background section, discloses a system in which one PVR synchronizes with another PVR by sending out a status message to the other PVR. The message issues when the user of the initiator PVR operates a PVR function such as start up, fast forward or rewind, to allow the recipient of the message to perform the counterpart function to keep the presentation on both PVRs synchronized. The message is also transmitted periodically, to update the synchronization. Within the message is an identifier of the program being watched or to be watched, an indicator of the mode of watching (e.g. normal play, fast forward, pause, etc.), and the time or frame into the program. The time or frame allows the recipient PVR to synchronize its replay with that of the sending PVR, by comparing the time or frame in the message with its own the current time or frame.

In expanding on this concept of synchronizing a sending PVR with a recipient PVR by transmitting a time or frame from the sending PVR to the recipient PVR, it will be initially assumed, for purposes of illustrating the present invention, that both PVRs are playing back respective, identical copies of a video. The frame of the sending PVR is part of the sender's copy of the video, which resides in a bit stream that is stored in a storage medium. Similarly, frames of recipient PVR's copy of the video reside in a bit stream that is stored in the recipient's storage medium.

It will also be initially assumed that when the video timer of one PVR shows as its output the same time as does the other PVR's video timer, that the respective videos playing are at the same point content-wise in their respective playbacks. When any PVR fast forwards or rewinds, this correspondingly and synchronously advances or rolls back the time count of its respective video timer.

If, for example, the destination PVR's video timer reads 1 hour, 1 minute and 1 second at a time when the destination PVR receives from the sending PVR a message having as its output time stamp 1 hour, 1 minute and 2 seconds (set according to the sending PVR's video timer), this might indicate the destination PVR's playback is one second behind that of the sending PVR. It might be the case, for example, that, according to the timing of a single reference clock, the destination PVR started its playback one second after the sending PVR started its playback. Based on that premise, the destination PVR can take corrective action to compensate for the one second time difference. Specifically, if the transmission time of the message was negligible, e.g. one millisecond while the time difference is one second, the full one second time difference can be relied on to take corrective action to synchronize the respective playbacks on the PVRs. The destination PVR would, for example, "fast forward" its local copy of the program by a full second and increment its video timer by a second. By this action, the destination's playback would catch up content-wise with that of the sender, and the respective video timers of the sender and destination PVRs would become synchronized.

If, however, the transmission time was not negligible, it needs to be taken into account in comparing the output time stamp of the incoming message with the time the message is received at the recipient PVR so that the corrective compensation applied appropriately reflects the extent to which the respective video timers out-of-synch and, correspondingly, the extent to which the respective playbacks are content-wise out-of-synch.

However, the above technique alone will not always synchronize the video presentation, i.e. make concurrent the playback of corresponding frames in the respective playbacks. The assumption made above, that the content being shown on either PVR at any arbitrarily-selected, common video timer time, is identical, does not strictly hold. The programs recorded on the two PVRs may, for example, begin at the same nominal video start time, but differ slightly, perhaps a second or so, as to the actual point in the video at which they respectively start. As a result, if both playbacks were to be viewed side-by-side, one would lag the other. Thus, even if the video timers of both respective PVRs were perfectly synchronous, the respective showings of the video might be out-of-synch.

Also, even if the two playbacks were to be in synch initially, the presentation may drift out-of-synch as it progresses. For example, the speed at which the respective PVRs play back their respective copies of the video may differ. These differences become more significant if the two PVRs have different actual speeds in the fast forward or rewind mode, and may cause the viewings to fall out-of-sync after one of the PVRs fast forwards or rewinds, commanding the other to follow concurrently and synchronously.

Lack of synchronization may also occur from time to time, due, for example, to different commercials, and thus different commercial time periods, in the two playbacks. Both viewers, for instance, may be watching the same network, e.g. National Broadcasting Company (NBC), but through different cable or satellite providers, e.g. RCN or Time Warner.

If, on the other hand, it is the current frame, rather than the current time, that is conveyed in the message, non-negligible transmission time still needs to be taken into account to synchronize presentation. If, for example, the source PVR sends the destination PVR a message that indicates that frame number "n" is currently playing on the source PVR, the destination PVR needs to know the transmission time, if non-negligible, in comparing the frame number that it is playing at the time of receipt of the message to the frame number indicated in the message.

In the frame-based technique, even if the playbacks are in synch or transmission time is accounted for to bring the playbacks in synch, the PVRs may use different service providers that employ different compression schemes. One scheme might afford higher image quality than the other by including more frames; thus, the assumption above that the sender's copy of the video is the same as the recipient's copy cannot be strictly relied upon. In addition, adaptive techniques are often used to vary the number of frames capturing a moving image based on the amount of movement in the image, time instant to time instant. The difference in the frames numbers for corresponding video content makes synchronization based on frame numbers problematic.

For many situations, these synchronization errors are of such small magnitude that the viewers of respective playbacks do not notice them.

Yet, there exist viewing configurations in which "out-of-synch" effects are significant and interfere with viewing enjoyment. Moreover, in some scenarios where, for instance, people at mutually remote locations are jointly executing a task simultaneously, e.g., using a manual prerecorded in video form to repair a large online system, precise synchronization of a telephone message, the presentation and action based on the message and/or the presentation may be necessary.

To achieve precise synchronization, the present invention compares corresponding content or "landmarks" of pairs of video playbacks to be synchronized, determines video replay "distance" between the landmark pairs, and slows down or speeds up selected playbacks in accordance with these distances.

U.S. Pat. No. 5,870,754 to Dimitrova et al. ("Dimitrova"), entitled "Video Retrieval of MPEG Compressed Sequences Using DC and Motion Signatures", and incorporated herein by reference, compares "DC+M signatures" of a query video clip to DC+M signatures in a database to retrieve a video sequence whose content is similar to that of the query video clip, where a video clip is defined as a sequence of video frames.

In one Dimitrova embodiment, DC coefficient information from an I frame and motion vector information from the following frame are combined to form a digital signature, hence the term "DC+M signature".

An "I frame", under the MPEG (Moving Picture Experts Group) compression standard, is an intraframe coded frame, which is a coding of a single snapshot of an moving image. Interspersed between I frames are interframe coded frames comprised of information that represents merely a difference between the current state of the moving image and a reference state of the moving image as it existed at a previous moment.

The signature embodies characteristics of the frames it represents, but uses less data. Signatures of respective I frames in a query video clip are compared to respective I frame signatures in a database video clip. The total Hamming distance between the signatures of the query clip and the signatures of a database clip is calculated. (The total Hamming distance is the sum of the Hamming distances between respective signatures of query/database frame pairs of a current query clip and database clip, where the Hamming distance between two signatures is based on a bit-by-bit comparison between the signatures, as explained in Dimitrova).

Specifically, the methodology shifts iteratively along the database to define a current database video clip, simultaneously adding, to the clip, database frames (I frames) and dropping database frames (I frames), with each iteration. The total Hamming distance is recalculated at each iteration, and the minimum Hamming distance over all iterations identifies the database video clip that most resembles the query video clip.

An advantage to using Dimitrova signatures is that they can be derived without the overhead of fully decompressing the image bit stream. Thus, the Huffman or arithmetic coding can be decoded to leave the bit stream in partially decoded form so that, without further decompression, frequency components such as DC coefficients of an image transform such as the discrete cosine transform (DCT) can be utilized in forming the signature, as explained more fully in Dimitrova.

In the Dimitrova embodiment described above, I frames are used as the "representative frames", i.e. frames for which signatures are derived, if key frames have not been identified in the video sequence previous to Dimitrova's processing. Key frames are frames at shot boundaries, where a shot is a video sequence of a scene. Typically, there are a thousand or more shots in a movie. In another embodiment, Dimitrova uses all frames as representative frames.

The present invention has a goal similar to that of Dimitrova, to compare characteristics of two video streams, except that the present invention uses the comparison to synchronize presentation of renderable content of the streams, whereas Dimitrova merely seeks a video clip similar to the query video clip. To adapt Dimitrova matching for the present invention, query frames are compared not against database frames, as in Dimitrova, but against frames in the participant's copy of the video, so that presentation of the video by the initiator and by the participant can, as a result, be made synchronous. Also, for the sake of processing speed, preferably a single query signature, corresponding primarily to a single frame, is transmitted to the participant for comparison, rather than transmitting all the signatures of a Dimitrova query video clip, which correspond primarily each to a separate frame. Accordingly, since a single query signature is compared, in each iteration, to a single candidate participant frame, the Hamming distance between the signatures of that pair of frames is calculated. The overhead of a "total Hamming distance" calculation is thereby avoided.

SUMMARY OF THE INVENTION

The present invention provides a system that allows two or more people with personal video recorders (PVRs) to precisely synchronize their time-shifted viewing.

In one aspect, the present invention is directed to an apparatus for synchronizing presentation of renderable content of two digital bit streams that reside in respective storage media. Renderable content, as used herein, refers to content that is presentable in a form that a user can sense, e.g. visually or aurally. The apparatus includes a stream characteristic unit for deriving information characteristic of content of one of said streams and comparing the information to information characteristic of content of the other stream. Content of the one stream is played back by progressing forward in the one stream. The presentation is synchronized by modifying that progress based on the comparison.

In another aspect, the present invention is directed to synchronizing presentation of renderable content of two or more digital bit streams that reside in respective storage media. One of the streams is received, and information characteristic of content of the received stream is derived and incorporated into a signal which is outputted. When the signal is received, its characteristic information is compared to respective information characteristic of content of one or more of the other digital bit streams. Presentation of the two or more digital bit streams is synchronized by modifying the forward progress in the respective playbacks of the two or more streams based on the comparisons.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, in which like reference numerals identify similar or identical elements throughout the several views.

DETAILED DESCRIPTION OF THE PRESENTLY PREFERRED EMBODIMENTS

Figure 1:
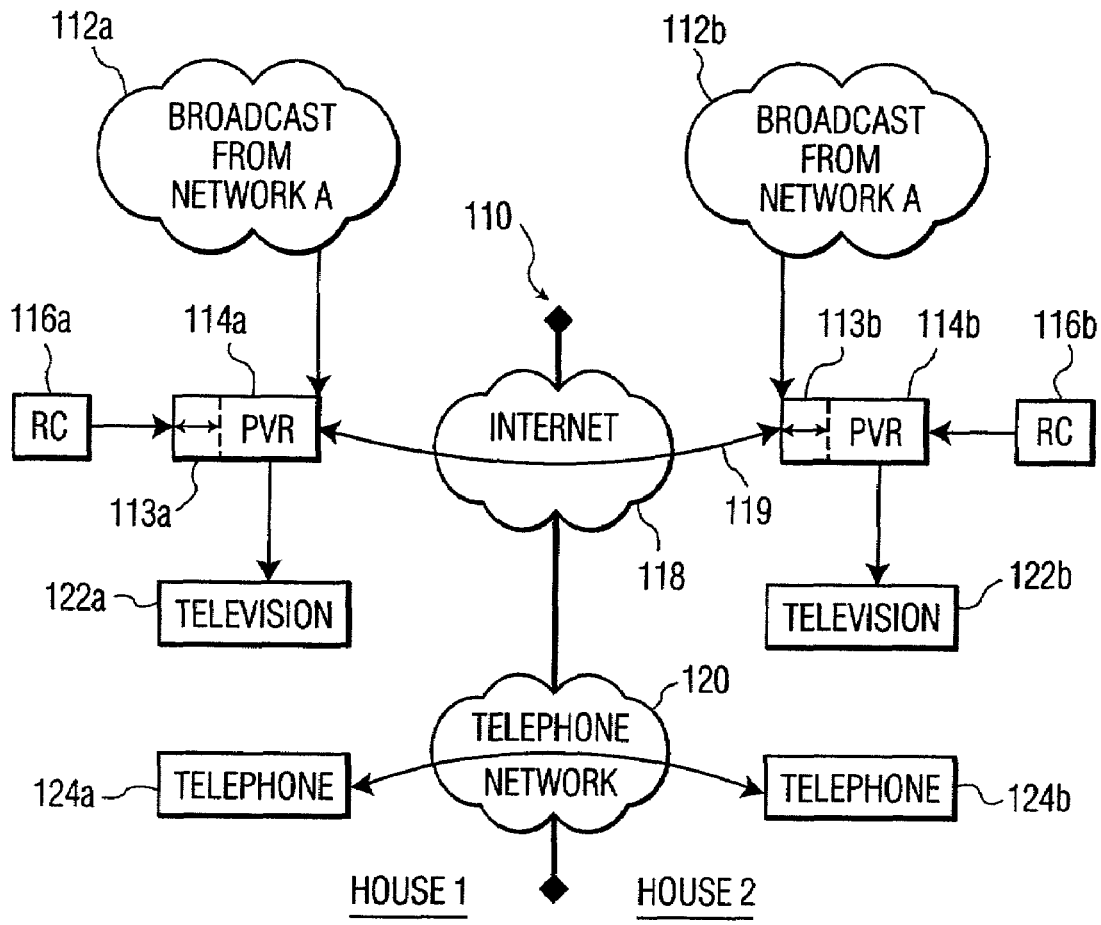
FIG. 1 is an illustration of a synchronized viewing system with which the present invention is usable.

Referring to FIG. 1, an example of a synchronized PVR viewing system 110 in accordance with the present invention is illustrated. As illustrated in FIG. 1, broadcasts 112a, b of a television program from network A is made pursuant to any communication means known to one having ordinary skill in the art, such as cable, digital cable, satellite, antenna, over the Internet or combinations thereof. The same network production, e.g., specific baseball game, is transmitted to each of House 1 and House 2. As the broadcasts 112a, b enter House 1 and House 2, respectively, they are received by receivers 113a, b housed within each of the respective PVRs 114a, b. Hereinafter, the suffix "a" refers to the "initiator", and the suffix "b" refers to a "participant", in a synchronized viewing session. Initially, the "initiator" is the PVR that starts the session, although that role is handed off to any PVR that, as directed by its user, performs a control function (e.g., stop, pause, fast forward, reverse). All other PVRs participating in the session are "participants". Depending on context, the user of the initiator PVR is referred to as the "initiator", and the user of a participant PVR is referred to as a "participant". Since the broadcasts 112a, b are received by the user, the user has the ability to record the broadcast 112a, b in the PVR 114a, b. The broadcast may be received in a receiver housed within a set-top box, DVD player, VHS player, personal computer, television, etc., and then routed to the PVR 114a, b. The user has the ability to record a variety of different programs in the PVR 114a, b along the bandwidth of the incoming broadcast signal. Additionally, since the broadcast signal is routed to each house separately, each house has the ability to separately turn the broadcast signal on or off. The PVR 114a, b has an output that is connected to an input on a television 122a, b so that the user may view the recorded programs on the television 122a, b.

A remote control 116a, b is commonly associated with the personal video recorder 114a, b to allow the user to operate the personal video recorder 114a, b remotely. Typically, the remote control 116a, b is configured to transmit an infrared signal to the television 122a, b.

The system 110 preferably has two communication networks associated therewith. The first is an Internet network 118 that interconnects the PVRs 114a, b located at the two different locations (e.g. House 1 and House 2). The Internet network 118 supplies the means 119 for communicating information between the PVRs 114a, b such that synchronization may be achieved. The second communication network is a telephone network 120, e.g., public switched telephone network (PSTN) or a private network, which provides a communication means for the two users to communicate while they are simultaneously viewing the recorded program 112a, b. Alternatively, either or both of the two communications networks may comprise Internet and/or telephone components.

In order to implement the system 110, one of the users, e.g. user 1 from House 1, will call the other user, i.e. user 2 from House 2, and the respective users will agree to simultaneously and synchronously watch a pre-recorded broadcast on their respective televisions. Here, pre-recorded broadcasts are intended to include live broadcasts that have been buffered for a delay period, which some receivers have the ability to do, so that the broadcast can be replayed continuously in a staggered time frame without commercials. After the users agree to view a program in synchronization, one of them would take the lead to initiate the system.

Assuming that user 1 takes the lead as the "initiator", user 1, via a remote control 116, via controls on the PVR 114a itself, or via control commands displayed on the television and activated by an input device such as a keyboard or remote controller, would activate a menu for synchronized viewing on the PVR 114a. User 1 would respond to and send the menu. Resulting other menus would be sent to user 2. The users would each indicate by their respective response to the menus they received whether or not they will be participating in the session. Based on the responses, a synchronized viewing session is established to begin at an agreed upon time. The agreed upon time may be a universal time, such as 9:00 P.M., or a relative time, such as in 5 minutes. A series of menus for establishing a viewing session are discussed in U.S. patent application Ser. No. 09/894,060, described above. A memory device and a processor preferably reside in either the PVRs 114a, b or one of the other devices associated with system 110. Programming code associated with the system 110 preferably resides in the memory device and is processed by the processor.

More than two users may participate in a synchronized viewing session; for example, users in three or more remote locations may arrange mutually by phone, by menus, by e-mail, by Internet chat, etc., to view a particular program simultaneously. During the session, viewers may drop out or be added to the session. When any session participant performs a control function (e.g., start, pause, rewind, fast forward), that participant's PVR 114b broadcasts a command for that function that is immediately communicated and effected in the PVR 114b of each participant, to keep the presentation synchronized. To ensure that the PVRs 114a, b participating in a session remain synchronous, a status message is sent out periodically by the "initiator", i.e., the PVR 114a that initiated the session. The status message is also transmitted with each command that is broadcasted in response to a participant performing a control function. The status message includes an indication of the program being watched, the current mode of watching (e.g., normal play, fast forward, pause), an indication of the time into the program, and information characteristic of content of a digital bit stream from which playback to the message sender is being generated. The characteristic information is used to "fine tune" the synchronization by zeroing in on similar content being viewed on the message recipients' PVR 114b.

Figure 2:
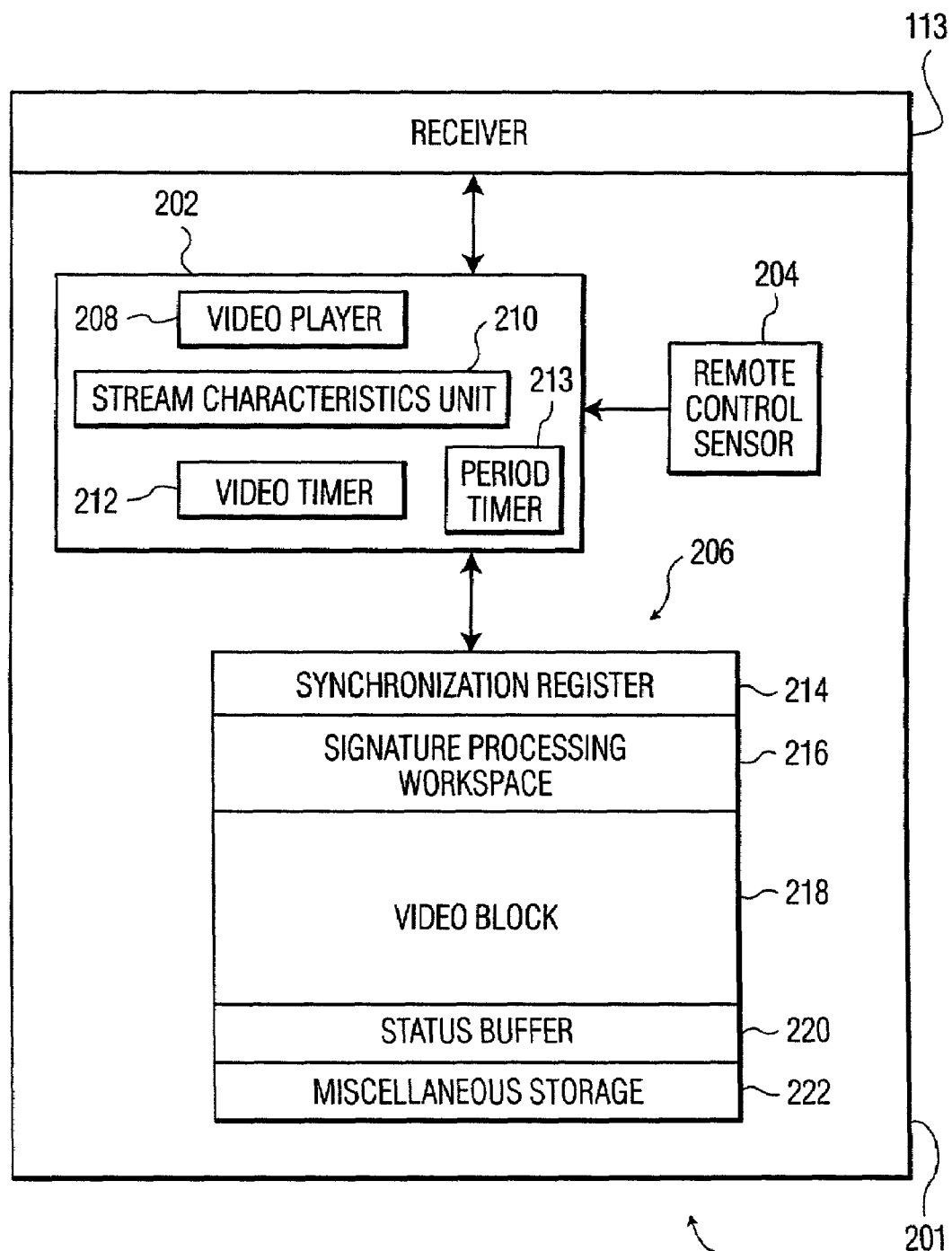
FIG. 2 is a diagram of the structure of a personal video recorder (PVR) in accordance with the present invention.

FIG. 2 provides a more detailed look at an exemplary PVR 114a in accordance with the present invention. Although the initiator PVR is shown, and, hence, the suffix "a" is used, any participant PVR would generally have the same architecture, because the role of initiator is handed off during a session to the latest PVR performing a control function. The PVR 114a includes a receiver 113a, and a video processing unit 201 comprised of a microprocessor 202, a remote control sensor 204, and a digital memory 206. The microprocessor 202 includes an image or video player 208, a stream characteristics unit 210, a video timer 212 and a period timer 213. The digital memory 206 includes a synchronization register 214, a signature processing workspace 216 a video block 218, a status buffer 220 and miscellaneous storage 222. The remote control sensor 204 receives a signal from the remote control 116a, operated by a user or viewer of the television 122a, and conveys a corresponding signal to the microprocessor 202. The microprocessor 202 reads from and writes to the digital memory 206.

Figure 3:
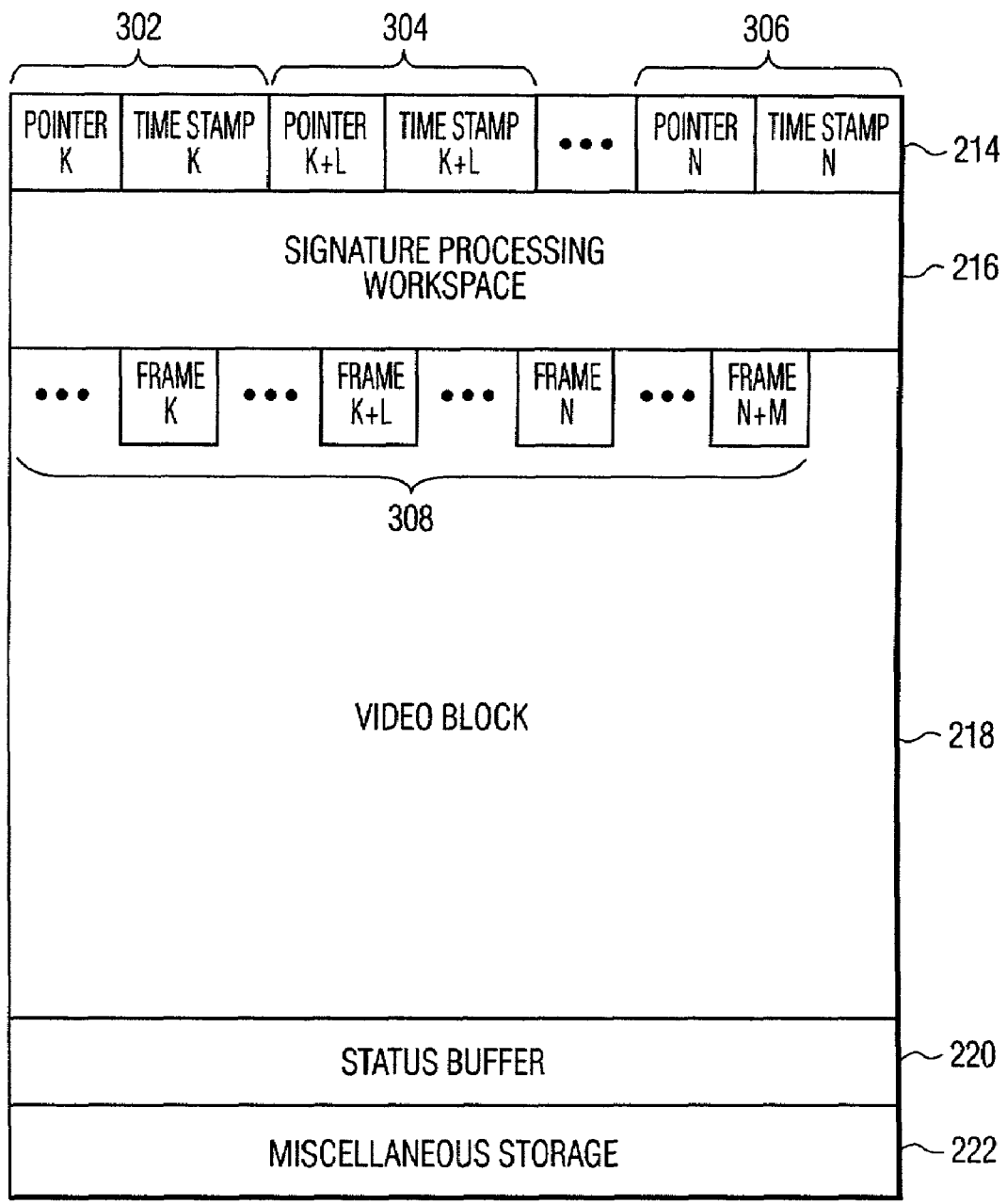
FIG. 3 is a diagram of a component of a PVR in accordance with the present invention.

FIG. 3 shows, in more detail, an exemplary structure of the digital memory 206. The synchronization register 214 is of the left-shifting, non-circular type and contains entries 302, 304, 306 and other intervening entries indicated by the dots. The video block 218 contains a program or video 308 having video frames K, K+L, N, N+M and leading and intervening frames indicated by the dots. Some of the frames between frames K and N, inclusive, correspond to respective entries that presently exist in the register 214. Thus, for instance, entry 302 consists of a pointer K to frame K, and a time stamp K corresponding to the time of playing of frame K. The entry 304 consists of a pointer K+L to the frame K+L, and a time stamp K+L corresponding to the time of playing of frame K+L. The dots between frames K and K+L indicate that there are intervening frames; yet, there are no corresponding entries in synchronization register 214. The reason for this lack of correspondence is that frames K and K+L are "I frames", whereas none of the frames intervening between frames K and K+L are "I frames".

All entries in the synchronization register 214 pertain to I frames, i.e., each pointer and associated time stamp relate to an I frame in the video 308. The entry 306 consists of a pointer N to the frame N, which is an I frame, and a time stamp N corresponding to the time of playing of frame N. Each entry is created by left-shifting the synchronization register 214 by the entry length, which is uniform for all entries, and loading the entry into the register 214 from the right at the time the frame (i.e., I frame) referenced by the entry is playing. Presentation of the video 308 spans all the times corresponding to time stamps in entries that contain a pointer to a frame of the video 308. The status buffer 220 contains current data on the status of the playback. Residing in miscellaneous storage 222 are any data needed during processing, such as data appearing in protected fields of a menu screen, error messages, etc.

Figure 4:
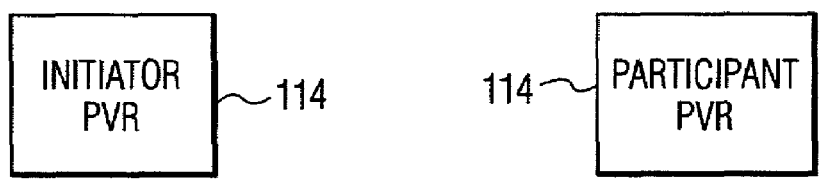
FIG. 4 is a message flow diagram demonstrating a synchronization technique in accordance with the present invention.
Figure 4:
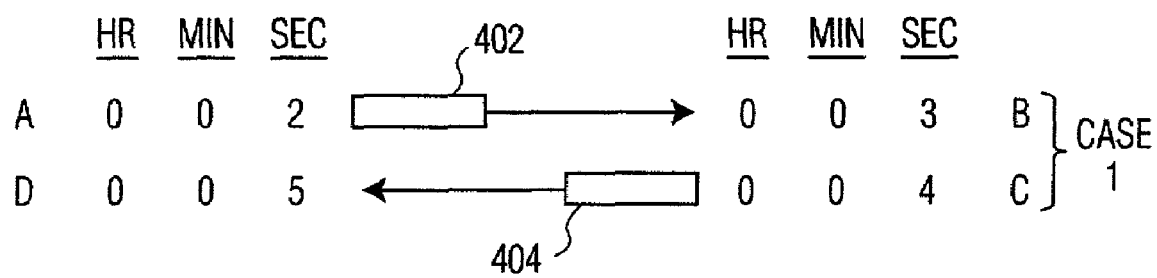
Figure 4:
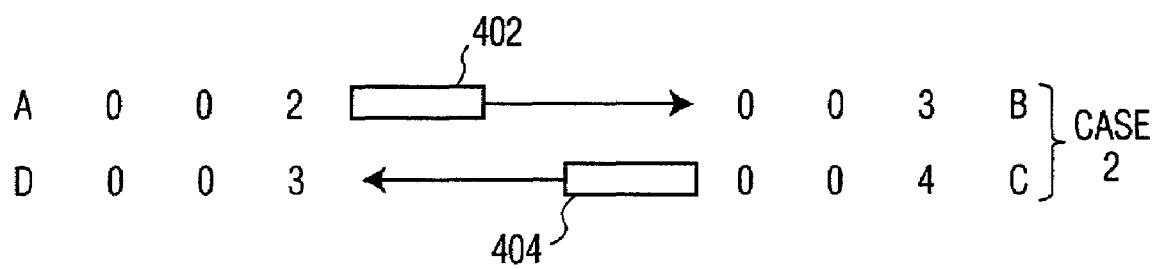
Figure 4:
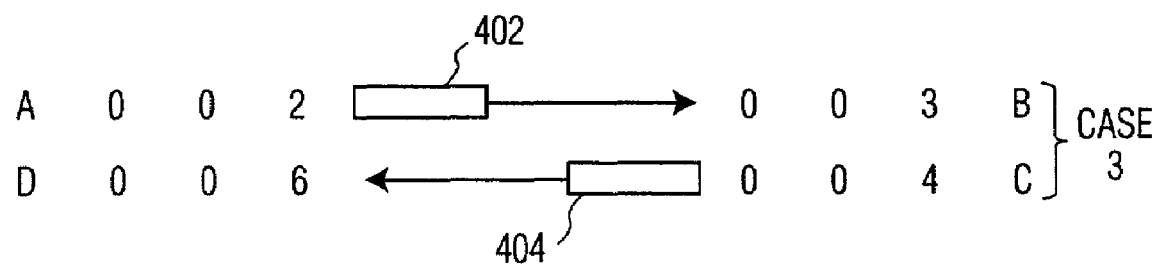

FIG. 4 depicts a possible message flow design in the present invention to determine the misalignment, if any, in the respective timings of the video timers 212 of two PVRs 114a, b, so that the timers can be synchronized. For simplicity of illustration, the discussion below focuses on synchronization between the initiator of the session and a single participant, because the initiator performs the same process to synchronize each participant, whereby all participants become synchronized. As mentioned above, the "initiator" may change during a session. Each time that a participant changes the watching mode i.e. executes a control function (rewind, fast forward, etc.), that participant broadcasts a command to all other participants (including the "current" initiator) and thereby becomes the new initiator.

Time synchronization can be implemented in many different known ways. Distributed processors (nodes) in a network can broadcast their respective clock values periodically to maintain synchronization. "Fault-Tolerant Clock Synchronization for Distributed Systems with High Message Delay Variation", Azevedo, Marcelo Moraes de, et. al., Irvine, Calif. (1995). Synchronization messages may be relayed between source and destination processors, where relaying nodes discard messages recognized as coming from a faulty node. "Communication Protocols for Fault-Tolerant Clock Synchronization in Not-Completely Connected Networks", Pfluegl, Manfred J. et. al., Irvine, Calif. (1992).

In the embodiment depicted herein, time synchronization is performed by the initiator PVR 114a individually with each participant PVR 114b, and involves sending an originating synchronization message 402 from the initiator PVR 114a to a participant PVR 114b and sending a reply synchronization message 404 from the participant PVR 114b to the initiator PVR 114a. It is assumed that the transmission times from the initiator PVR 114a to the participant PVR 114b and from the participant PVR 114b to the initiator PVR 114a are variable. It is further assumed that the transmission time for a reply message 404 is approximately equal to the transmission time of the originating message 402 to which the reply message 404 is replying. Differences between the respective transmission times are resolved by the present innovative "fine tune" aligning based on content of respective digital bit streams of the initiator and the participant, as will be discussed below.

In a first, exemplary case of timer or time synchronization, which is labeled in FIG. 4 as "CASE 1", the initiator PVR 114a sends an originating synchronization message 402 to the participant PVR 114b. The message 402 is sent at a time A which is 0 hours, 0 minutes and 2 seconds according to the video timer 212 of the initiator PVR 114a. The message 402 arrives at the participant PVR 114b at a time B when the participant PVR 114b video timer 212 reads 0 hours, 0 minutes and 3 seconds. The participant PVR 114b sends back a reply synchronization message 404 at a time C when the participant PVR 114b video timer 212 reads 0 hours, 0 minutes and 4 seconds. The message 404 is received by initiator PVR 114a at a time D when the initiator PVR 114a video timer 212 reads 0 hours, 0 minutes and 5 seconds.

The time misregistration, TM, between the respective video timers 212 of the initiator and participant PVRs 114a, b is given by the formula:

$$TM = \frac{1}{2}[(A+D)-(C+B)] \quad (1)$$

In this first case, the time misregistration is ½[(2+5)−(4+3)]=0 seconds, i.e. the two timers 212 are exactly synchronized, i.e. a transmission time of one second for each of the messages 402 and 404 accounts for the timings in this case.

In CASE 2, an originating synchronization message 402 is sent from the initiator to the participant PVR 114b, and a reply synchronization message 404 is sent from the participant to the initiator PVR 114a. The time misregistration in CASE 2 is ½[(2+3)−(4+3)]=−1 second. Here, the initiator's video timer 212 lags the participant's timer 212, the transmission time is negligible and the timing difference is almost totally due to misregistration between the two video timers 212. The magnitude of the time misregistration is one second. The sign of the time misregistration indicates whether the initiator lags the participant, or vice versa. If the sign is negative, as in the current case, the initiator lags the participant; if the sign is positive, the participant lags the initiator.

In CASE 3, an originating synchronization message 402 is sent from the originating to the participant PVR 114b, and a reply synchronization message 404 is sent from the participant PVR 114b to the initiator PVR 114a. The time misregistration is CASE 3 is ½[(2+6)−(4+3)]=½ second; in effect, the transmission time is 1½ second and the participant lags the initiator by ½ second. That is, the message 402 arrived at the participant PVR 114b when the video timer 212 of the initiator PVR 114a read 3½ seconds, and, at the same time, the video timer 212 of the participant PVR 114b read 3 seconds, this 3½−3=½ second difference representing the ½ second time misregistration magnitude. Accordingly, one second later, when the timer 212 of the initiator PVR 114a reads 4½ seconds, the participant sends the reply message 404, which arrives, after a transmission time of 1½ seconds, when the timer 212 of the initiator PVR 114a reads 6 seconds.

Figure 5:
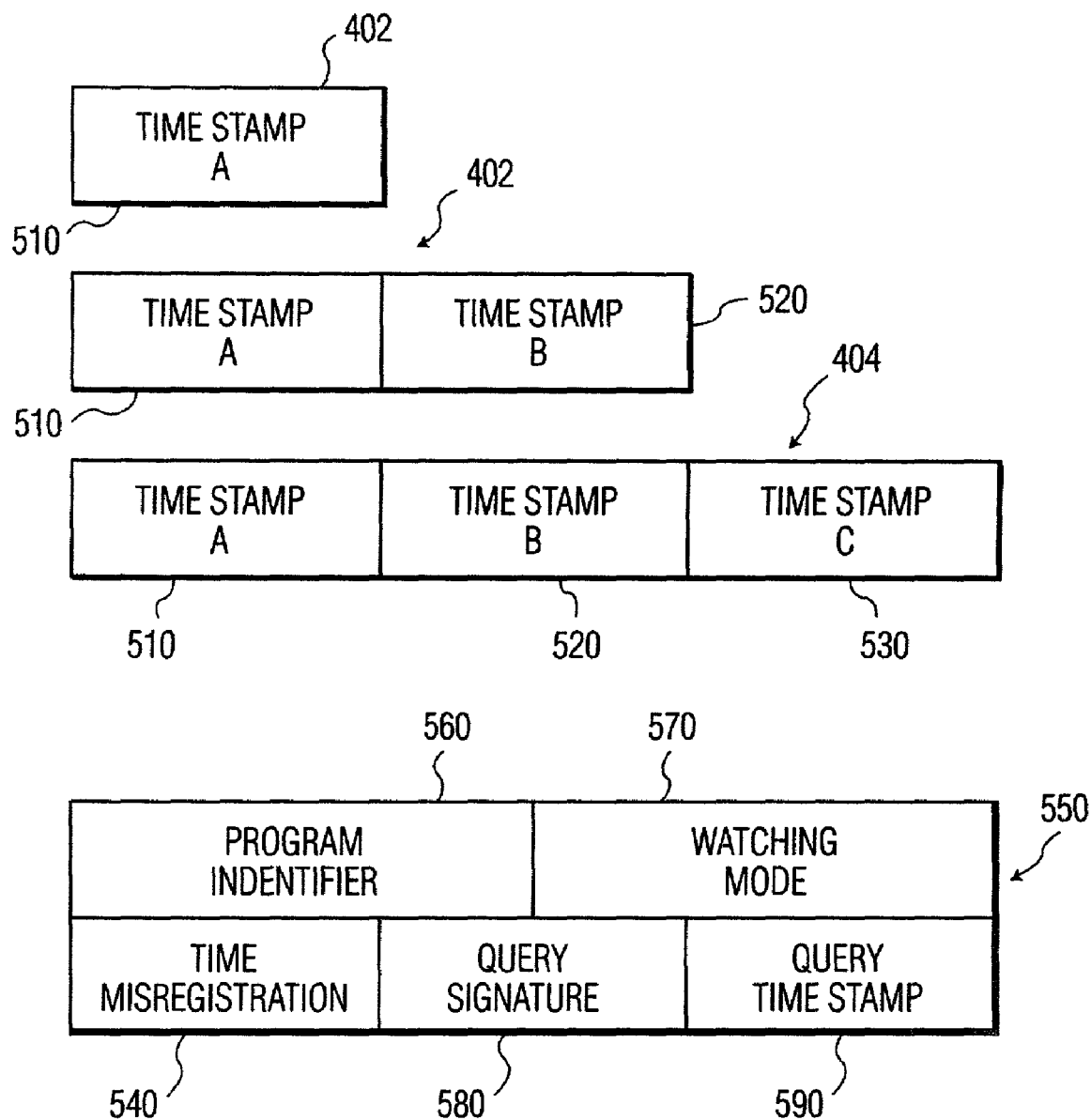
FIG. 5 is a message format diagram for messages shown in FIG. 4.

FIG. 5 illustrates an example of message formats utilized in the present invention to perform time synchronization. Referring back to any of Cases 1, 2 or 3 in FIG. 4, the originating message 402, at the time it is transmitted by the initiator PVR 114a, has a field 510 containing time stamp A (corresponding to time A in FIG. 4), as shown in the first format in FIG. 4. Upon arrival at the participant PVR 114b, a field 520 containing time stamp B is added to the originating message 402, as shown in the second format. Just prior to sending the reply message 404 back to the initiator PVR 114a, the participant PVR 114b also adds a field 530 containing time stamp C, as shown in the third format, to convert the originating message 402 to the reply message 404. The initiator PVR 114a receives the reply message 404 at time D (as in FIG. 4), calculates the time misregistration, TM, based on formula (1), and places the calculated time misregistration 540 into a status message 550, into which it also inserts a program identifier 560, watching mode 570, a query signature 580 and a query time stamp 590. The program identifier 560 identifies the video 308 that is currently playing. The watching mode 570 is control information for controlling processing of the PVRs 114a, b and denotes the state of the PVRs 114a, b, as discussed further below.

The query signature 580 is information characteristic of content of the digital bit stream from which the initiator plays back its own copy of the video 308. That information is to be compared to signatures derived based on the participant's copy of the video 308, in order to fine tune the synchronization of the participant's playback of its copy of the video 308 with playback of the initiator's copy of the video 308.

In the present invention, the signature to be compared to the query signature 580 (which is the signature of an I frame, since a query frame is an I frame) in the first iteration in the present invention is the signature of the I frame of the participant PVR 114b whose time stamp is closest to the time stamp 590 of the query frame. That candidate participant frame (which is also an I frame, since all candidate participant frames are I frames) with the closest time stamp is the participant's first candidate frame. Subsequent candidate participant frames, each progressively further along in the participant's bit stream with each iteration, are compared one-by-one with the query frame. For each candidate participant frame, there is a respective calculation of the Hamming distance between the signatures of the candidate participant frame and the query frame. Signatures in the present invention are calculated by techniques disclosed in Dimitrova. The minimum Hamming distance over all iterations is determined to identify the participant frame most similar content-wise to the query frame, and the cumulative shifts down the participant's video frame sequence to arrive at the identified frame correspond to an estimate of the "frame misregistration" between the initiator's playback and the participant's playback. "Frame misregistration" is used hereinafter to refer to the content-wise misalignment of two playbacks. When frame misregistration has been estimated, the participant then fast forwards or rewinds its copy of the video 308 to compensate for the frame misregistration.

A situation in which the participant fast forwards without estimating frame misregistration is where the participant is new to an ongoing session. Since the new participant generally will require extensive fast forwarding of its playback to catch up to that of the initiator, estimating frame misregistration would be cumbersome unless the new participant's playback were first advanced to a point in "video time" that approximates the video time of the initiator.

First, to join a currently active synchronized viewing session, a user of a potential participant PVR 114*b* solicits, via the telephone 124 or menu screens, the consent of the users of current participant PVRs 114*a, b* and then signs on via a menu screen. If the users of the current participant PVRs 114*a, b* approve, the potential participant PVR 114*b* becomes a new participant PVR 114*b*, to be synchronized with the initiator PVR 114*a*.

Figure 6:
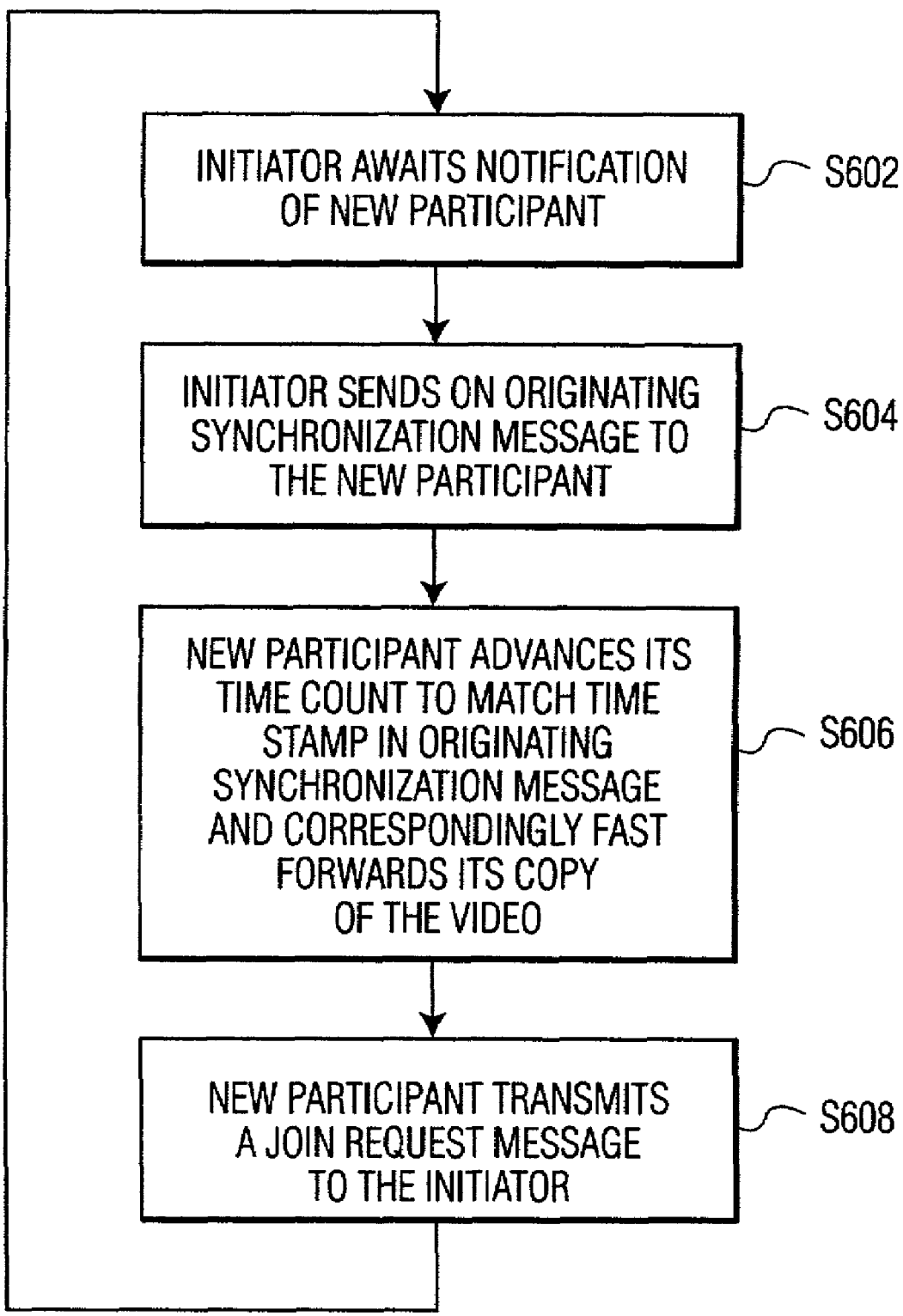
FIG. 6 is a flow chart of the process of joining an ongoing session in accordance with the present invention.
Figure 7A:
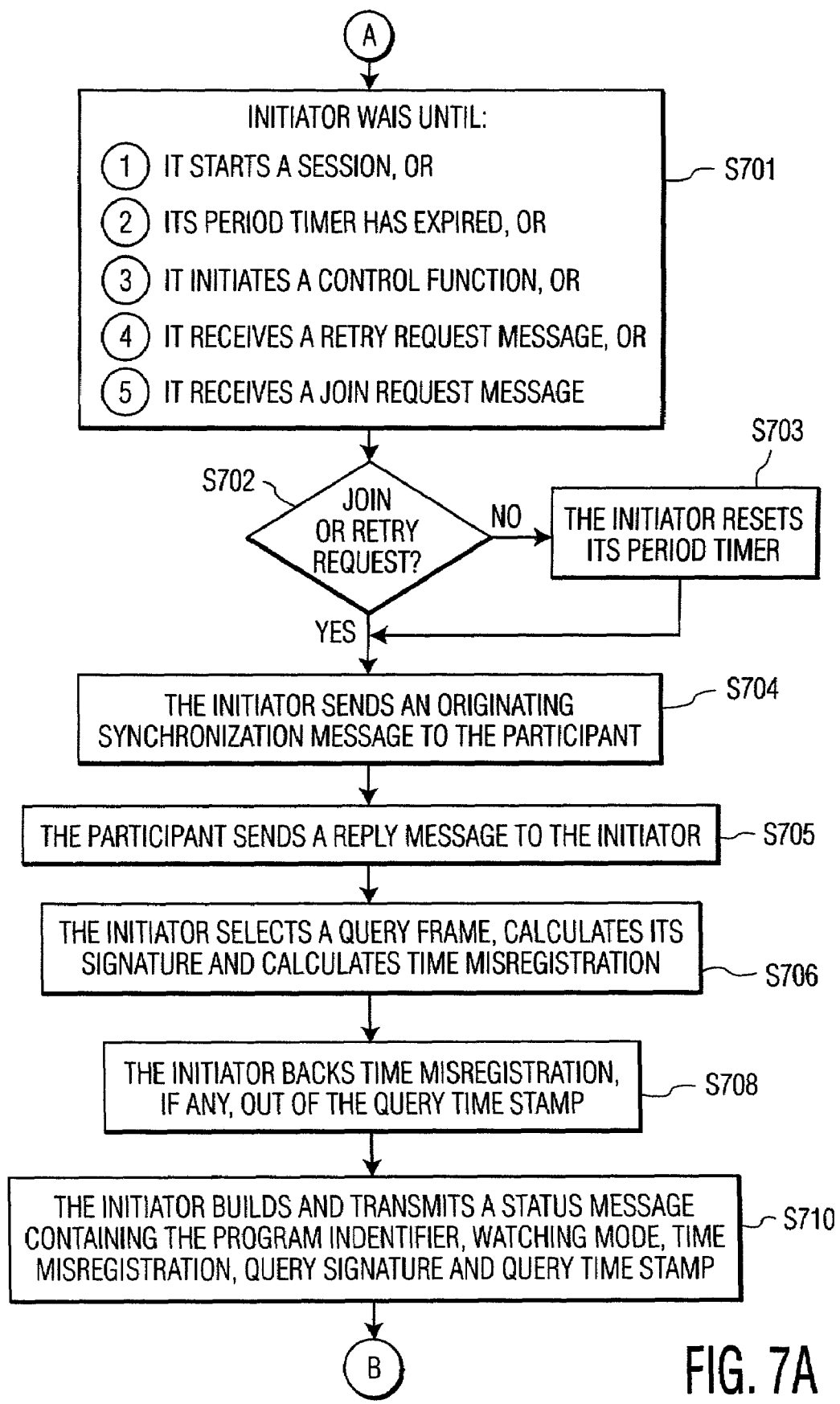
FIGS. 7A and 7B are flow charts of time synchronization in accordance with the present invention.
Figure 7B:
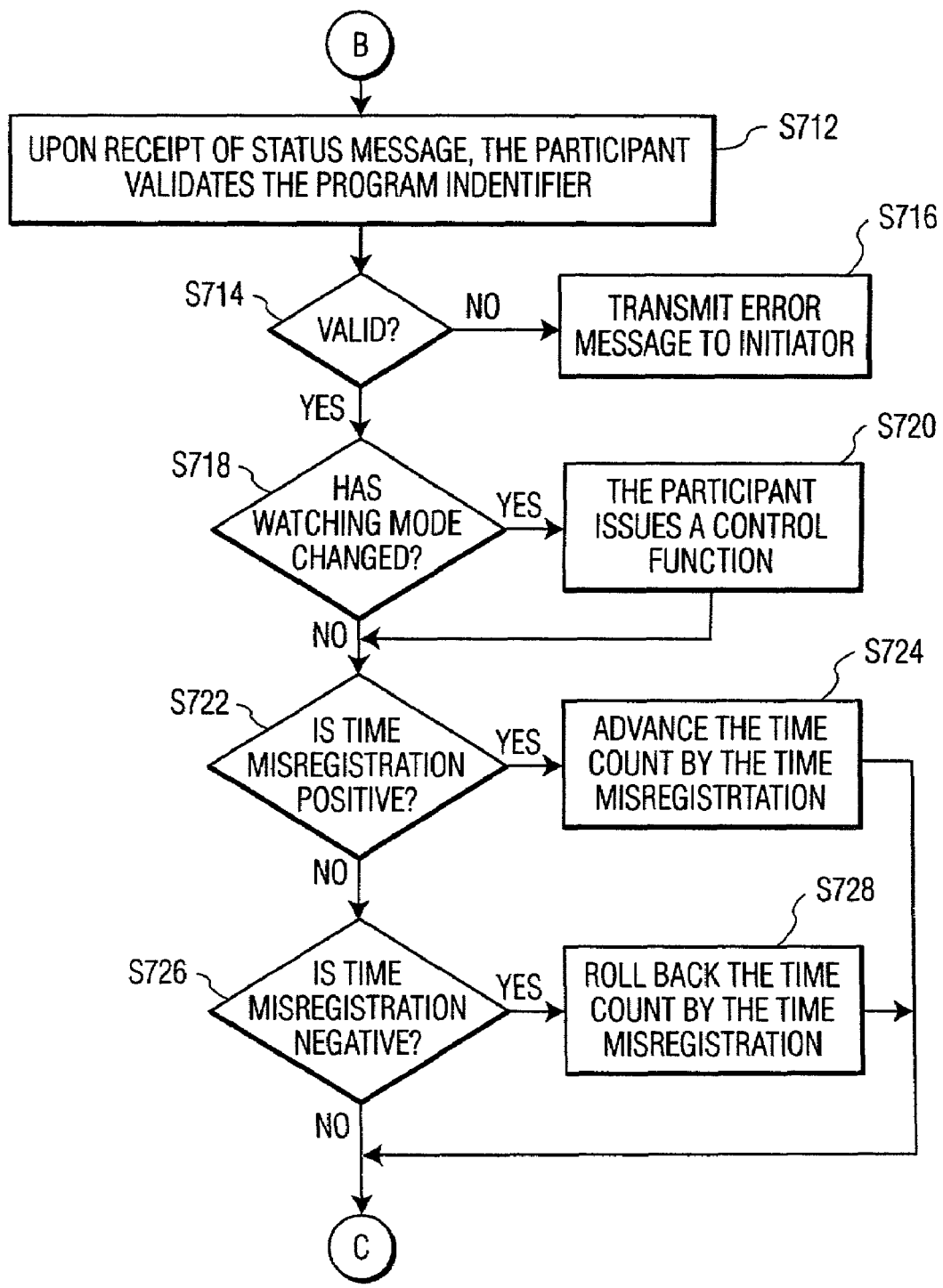

As seen in the ongoing session join process of FIG. 6, the new participant PVR 114*b* notifies the initiator PVR 114*a* that it is joining the current session (step S602). The initiator PVR 114*a*, in response, sends an originating synchronization message 402 to the new participant PVR 114*b* (step S604). Upon receipt, the new participant PVR 114*b* advances the time count of its video timer 212 so that the value of the time count matches time stamp A contained in the message 402, and, correspondingly, fast forwards its copy of video 308 (step S606). The point in the playback fast forwarded to corresponds to the value of the advanced time count, so that the new participant's playback has caught up content-wise with the playback of the initiator. The new participant PVR 114*b* then transmits to the initiator PVR 114*a* a join request message (step S608), to proceed with a fine tuning of its synchronization with the initiator PVR 114*a* by means of time synchronization followed by frame synchronization. FIGS. 7A and 7B are flowchart depictions of an example of time synchronization according to the present invention. In the current example, there are five possible triggering events for the synchronization process: (1) start of a session, (2) the initiator's period timer 213 expires, (3) the initiation of a control function, (4) a retry request message is received, or (5) a join request message is received (step S701). The initiator's period timer 213 counts the time interval until the initiator will again synchronize the session participants. A retry request message is issued by a participant to the initiator when an attempted frame synchronization has been unsuccessful, and requests that synchronization with the participant be retried after a predetermined period of time.

For the first three of the five events in step S701, the initiator PVR 114*a* synchronizes with all participant PVRs 114*b*; whereas, for the latter two events, the initiator PVR 114*a* synchronizes with only one of the participant PVRs 114*b*, in which case, the initiator PVR 114*a* period timer 213 is not reset, because only a single participant PVR 114*b* is to be synchronized. In step S702, it is checked if the triggering event is one of the latter two events. If not, the initiator resets its period timer (step S703).

Next, the microprocessor 202 of the initiator's PVR 114*a* checks its video timer 212, places its time count as time stamp A into field 510 of the originating synchronization message 402, and transmits the message 402 (step S704). The microprocessor 202 of the participant's PVR 114*b* checks its video timer 212 upon receipt of message 402 and saves the time count as time stamp B in field 520 of the message 402. The participant's PVR 114*b* further augments the originating synchronization message 402, and thereby transforms the originating synchronization message 402 into the reply synchronization message 404, by creating field 530 and placing time stamp C from the participant's video timer 212 into field 530 of message 402. The participant's PVR 114*b* then immediately transmits the reply message 404 to the initiator's PVR 114*a* (step S705). Upon receipt of reply message 404, the initiator's microprocessor 202 checks its video timer 212 for the time of receipt, time D, and uses it, together with the time stamps in the fields of the message 404, to determine the time misregistration 540, TM, based on formula (1).

Prior to or concurrent with the time misregistration calculation, the initiator's microprocessor 202 selects a query frame. This preferably is a frame that the initiator has just played or has recently played, so that the content of the query frame and its respective time stamp represent where the playback is in the content at a particular time which is current. In any event, the query frame selected is one that still is represented as an entry in the initiator's synchronization register 214, which is constantly shifting out (a non-circular shift register deletes data by shifting it out) entries as its playback progresses. The stream characteristics unit 210 calculates the query signature 550 for the query frame (step S706).

The initiator's microprocessor 202 subtracts the time misregistration, TM, from the query time stamp 590 to back the calculated time misregistration 540, if any, out of the query time stamp 590 (step S708), which is the time stamp in the synchronization register entry that resides along the pointer to the query frame. Backing out the time misregistration 540, normalizes placement and the size of the range in which a search is conducted for the participant frame that content-wise most resembles the query frame. Thus, although the time misregistration 540 is added to the time count (step S714), it is subtracted from the query time stamp 590.

The initiator's microprocessor 202 then retrieves the program identifier 560 and the watching mode 570 from the status buffer 220, and stores them, along with the time misregistration 540, query signature 580 and modified query time stamp 590 into the status message 550. The initiator's microprocessor 202 then transmits the status message 550 to the participant (step S710).

Upon receipt of the message 550, the participant's microprocessor 202 compares the program identifier 560 in the message to its own program identifier 560 in its status buffer 220 to assure that the participant's user is currently viewing the same video as is the initiator's user (step S712). If not (step S714), the participant's microprocessor retrieves an error message from the miscellaneous storage 222 and sends the message to the initiator (S716), because, in the synchronized viewing session, it is intended that all participants view the same program concurrently. Otherwise, if the participant is viewing the same program, the participant's microprocessor checks the watching mode 570 in the message 550 (S718). If it matches the current watching mode in the participant's status buffer 220, processing proceeds. If it does not match, the participant's microprocessor 202 issues a control function to its PVR 114*b* to immediately convert its current watching mode to match the watching mode received in the message 550, i.e. to, for example, fast forward or rewind in response to the initiator's fast forward or rewind (step S720). The participant's microprocessor 202 also makes the corresponding change in watching mode in it status buffer 220.

In any event, if the program identifiers of the participant and initiator match, the participant's microprocessor 202 compensates for time misregistration, by advancing the time count of its video timer 212 by the magnitude of the time misregistration, if the time misregistration is positive, or by rolling back the time count of its video timer 212 by the magnitude of the time misregistration, if the time misregistration is negative (steps S722 through S728). (The advancing or rolling back of the time count is performed without executing any corresponding fast forward or rewind operation on the video 308 playing, these latter function being attended to instead during a subsequent frame compensation.) Time misregistration compensation (or "time compensation"), if any, is preferably carried out, by the participant, concurrent with the change, if any, in watching mode the participant performs in response to the message 550.

In an alternative embodiment, the initiator can share time compensation duties with the participants. Particularly, if the session includes, in addition to the initiator, only one participant, the initiator can fully assume time misregistration compensation, and eliminate the overhead of maintaining a time misregistration field 540 in the status message 550. Another option is for the initiator to assume only fast forwarding or only rewinding duties, and to delegate the other duties, i.e., fast forwarding or rewinding, to the participant. As a further enhancement, if the calculated time misregistration, TM, exceeds a predetermined threshold, the initiator and participant can bridge the gap synchronously, one rewinding and the other fast forwarding, to synchronize faster.

Moreover, the present invention, however, is not limited to any particular time synchronization method.

Figure 8:
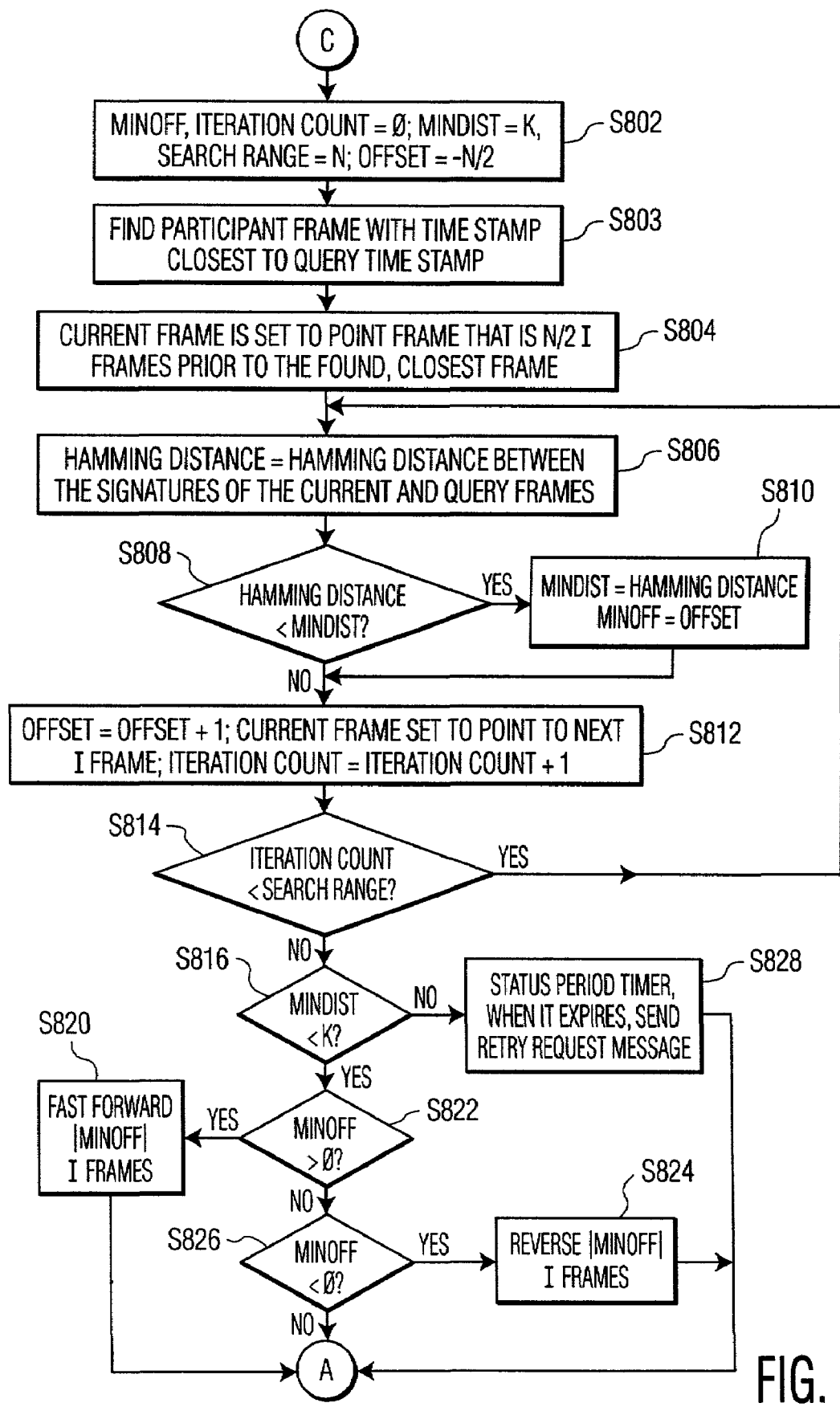
FIG. 8 is a flow chart depicting frame synchronization in accordance with the present invention.

After time compensation, the participant then proceeds to determine frame misregistration, and if it exists, compensate for it so that frame synchronization is achieved. An exemplary process for determining frame misregistration and responsive compensation is more fully detailed in the flow chart as continued in FIG. 8. First, variables in the iterative process are initialized (step S802). MINOFF is the minimum offset of any candidate frame that has yet been considered. MINOFF and ITERATION COUNT are set to zero. MINDIST, which stands for the current minimum Hamming distance between the query frame and those of the participant's frames that have been checked, is initialized to K, which is set large enough to indicate, at the outset of the first iteration, that no match has yet been found.

The "search range" defines a range of candidate frames in the participant's bit stream. SEARCH RANGE is set to a predetermined number "N", the number of I frames in the search range. The search range (step S802) is located so that the frame pointer associated with the closest time stamp, and residing together with that time stamp as an entry in the synchronization register 214, points to the frame placed in the middle of the search range. "N" may be varied in accordance with the anticipated degree of frame misregistration; a larger "N" affords a wider search, allowing for greater compensation in response to the determined misregistration.

The value "N" may also vary in accordance with anticipated disparities in the transmission times of the originating message 402 and its counterpart reply message 404, since the disparity will distort the calculated time misregistration, and, correspondingly, the amount of time backed out of the query time stamp. Since the backing out procedure normalizes the placement of the search range, a larger "N" provides a larger search range to compensate for the distortion. As mentioned above, the methodology of the invention assumes that these two transmission times are equal, but, by the above-described mechanism, is capable of compensating for inequality.

OFFSET is the offset from the center of SEARCH RANGE at which the current candidate frame is located. Since the current candidate frame is, at the outset, located at the end of the search range with the frames of earliest time stamp, OFFSET is initialized to $-N/2$.

In step S803, the participant compares the query time stamp 590 to each time stamp in its synchronization register 214 to determine the closest time stamp. As an alternative to making comparison to each time stamp in the register 214, the comparisons can be terminated when the difference between the query time stamp and a time stamp in any comparison falls below a predetermined threshold, and is therefore deemed indicative of a match.

CURRENT FRAME, at the start of the iterations, is set to point to the frame N/2 I frames prior to the center frame, i.e. at the time-wise earliest end (starting end) of the search range (step S804). The Hamming distance between the signatures of the current and query frames is calculated (step S806) by the participant's microprocessor 202 by techniques described in Dimitrova. The Hamming distance indicates the degree of content similarity between the current and query frame; a small Hamming distance indicates higher resemblance, whereas a larger distance indicates lesser resemblance. The calculation utilizes storage provided in the signature processing workspace 216.

If the current Hamming distance, represented by the variable HAMMING DISTANCE, is less than the MINDIST (step S808), MINDIST and MINOFF are updated (step S810). Ultimately, MINOFF will correspond to number of I frames encountered in fast forwarding or rewinding to correct for frame sequence misregistration.

Once the minimum distance MINDIST and minimum offset MINOFF are updated, OFFSET and ITERATION COUNT are both incremented by one, and the next I frame is designated as the CURRENT FRAME in preparation for another iteration (step S812). If ITERATION COUNT is smaller than SEARCH RANGE (step S814), another iteration is executed. Otherwise, MINDIST is compared to K (step S816). If MINDIST is less than K, indicating that a match has been found, the participant fast forwards, i.e., moves forward in the video 308 faster than the video moves in normal play (step S820) for a positively-valued MINOFF (step S822); or rewinds, i.e. moves backward in the video (step S824) for a negatively-valued MINOFF (step S826), by |MINOFF| I frames in its video bit stream to compensate for frame misregistration, where |MINOFF| represents the absolute value or magnitude of MINOFF. Thus, although, in the course of playing back video 308, the participant's video player 208 progresses forward in its bit stream to play back content of the stream, that progress is modified as to direction and magnitude based respectively on the sign and magnitude of MINOFF, which represents a comparison between characteristic information of the participant's and the initiator's respective bit streams. It is noted that an alternative to rewinding is slowing down the forward progress of the video player 208, or halting the forward progress of the video player 208 for a time period based on |MINOFF|, a technique that is feasible if |MINOFF| is small. As another option, the video player 208 can be implemented to proceed forward or backward in the video 308 by an amount of "video time" that is based on the value of MINOFF. The video time increment or decrement can be determined from a table referenced by MINOFF or can be calculated algorithmically. Alternatively, movement forward and/or backward in video time can be dictated by a complex set of predetermined instructions, such as a macro, e.g., go forward by time x and back by one I frame.

If, on the other hand, MINDIST remains equal to K, it is decided that no match of the query frame was found. As a result, the participant PVR 114b starts its period timer, which expires after a predetermined period of time. When the period timer expires, the participant PVR 114*b* sends a retry request message to the initiator (step S828).

As was the case with time compensation, frame compensation duties can be shared among the initiator and participants, in an alternative embodiment.

In operation, a potential viewer of the video 308, arranges for a particular video start time with other potential viewers by means of, for example, the telephone 124*a* or by using the remote control 116*a* to navigate and complete a menu that has appeared on the television 122*a*. Menu templates could reside, for example, in miscellaneous storage 222. The potential viewer, acting as the initiator of a synchronized viewing session, then, by means of an initiation menu, schedules the session to start at the video start time. Each session participant's video timer 212 starts at, for example, 0 hours, 0 minutes and 0 seconds, to play its respective local copy of the video 308. Each local copy of the video 308 is essentially the same; although, they may differ, for *p1709Xexample, compression techniques and parameters used, as to exact control function speeds and as to the exact starting point in the video program.

Following a time compensation, the participant PVR 114*b* compensates for frame misregistration, which may entail a rewind or fast forward operation on the playback, during which time, the adding of entries to the synchronization register 214 is suspended. If the compensation entails rewinding, the adding of register 214 entries resumes when the playback progresses to the point where entries no longer pre-exist in the register 214; if it entails fast forwarding, adding of entries resumes with the destination frame of the fast forwarding.

Time and frame synchronization is preferably performed periodically to keep the presentation synchronized. They are also preferably carried out with each function control command issued by a PVR 114*a* as a result, for example, of interactive operation of input means to the PVR 114*a, b* by a user viewing the presentation that changes the watching mode. In the latter case, the user's PVR 114*a, b* becomes the new initiator PVR 114*a*, with whom all participant PVRs 114*b* maintain synchronization, until another participant PVR 114*b* assumes the role of initiator PVR 114*a* by broadcasting a command that other participant PVRs 114*b* follow its control function. Accordingly, an initiator PVR 114*a* that receives a command that changes the watching mode knows that it is no longer the initiator PVR 114*a*, and a participant PVR 114*b* that issues the command knows that it is now the initiator PVR 114*a*.

The embodiments disclosed are merely exemplary of the invention. For example, when watching mode changes, the program identifier 560 and the watching mode 570 can be broadcasted without an accompanying time misregistration 540, query signature 580 and query time stamp 590, so that the new watching mode is put into effect faster by all recipient PVRs. Alternatively, the program identifier 560 and the watching mode 570 can be transmitted unaccompanied only in the case of selected watching mode transitions, e.g., to fast forward or to rewind. In fact, whether or not watching mode changes, the query signature 580 and the query time stamp 590 can be transmitted separately from time misregistration 540, program identifier 560 and watching mode 570; that is, time misregistration and frame misregistration can be calculated and compensated for asynchronously.

Although, for simplicity of illustration, drawings and portions of the specification describe or refer to a session for synchronizing presentation of two bit streams, it is to be understood that the scope of this invention applies to synchronizing presentation of multiple bit streams. Accordingly, for example, where one initiator PVR and one participant PVR are shown or referred to, the embodiment operates with an initiator PVR and multiple participant PVRs.

The initiator PVR 114*a* is described as receiving and responding to the retry request message from the requesting participant, but, alternatively, any of the other participants can receive and respond to the retry request message.

Although the copies of video 308 are described as recorded from broadcasts, this is not a limitation. The video copies could be downloaded from a service provider or compact discs containing the video copies could be inserted into the respective PVRs. The video copies whose playback is being synchronized need not be remotely located, nor locally located at their respective PVRs.

In the above embodiments, only I frames are considered in determining frame misregistration. In the present invention, as in Dimitrova, key frames, rather than I frames, can be used as the representative frames. The set of key frames would be roughly the same for each participant irrespective of the compression technique employed, thereby affording accurate frame sequence misregistration determination, and therefore accurate synchronization. Alternatively, all frames can be deemed representative frames, where signature determination follows the procedure specified in Dimitrova.

The scope of the present invention is not limited to Dimitrova signatures. Other techniques for creating signatures are discussed in U.S. Pat. No. 6,266,429 to Lord, et. al., entitled "Method for Confirming the Integrity of an Image Transmitted with a Loss", which is incorporated in its entirety herein by reference.

This invention applies generally to synchronizing presentation of renderable content of two or more digital bit streams. The presentation may be merely visual or merely aural or both visual and aural. The bit streams need not contain both image and audio data. Thus, the characteristic information may be characteristic of viewable images or of audible sounds. Nor is it necessary that the characteristic information comprise signatures. For example, image and/or audio transform coefficients, as appropriate, can be used to characterize the content of the bit streams.

As portrayed in the above embodiments, signatures are derived "on the fly" when needed, although, alternatively, faster synchronization processing is achieved by pre-computing the signatures, for example, while the PVR 114 is receiving a broadcast that is to be replayed at a later time. The broadcasted digital bit stream, as it is received, can be partially decompressed to derive signatures, which are stored and referenced by corresponding tags that are embedded in the digital bit stream. During playback, each tag is used to summon the respective signature of the query or candidate frame. Accordingly, in forming the query synchronization message and/or in matching candidate frames' signatures to an incoming query signature, the need to resort to "on the fly" derivation is avoided.

Moreover, the invention can be implemented using watermarks or textual tags instead of signatures. Watermarks purposely introduce noise into the content periodically, e.g. every second. A textual tag is an identifier in textual form. The stream characteristics unit derives the watermark or tag from the digital bit stream that incorporates the video 308, as information characteristic of content of the bit stream. After time synchronization, content-wise alignment is achieved by associating each watermark or tag with a respective time.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for synchronizing presentation of renderable content of at least two digital bit streams that reside in respective storage media, said apparatus comprising:
    a stream characteristic unit for deriving information characteristic of content of one of said streams;
    means for receiving a signal that carries information characteristic of content of the other stream;
    means for comparing said information of said one stream to said information of the other stream;
    a player for progressing forward in said one stream to play back content of said one stream; and
    means for synchronizing said presentation by modifying said progress based on said comparison by said comparing means.

2. The apparatus of claim 1, wherein said streams include image data and said presentation is at least partially visual.

3. The apparatus of claim 1, wherein said streams include audio data and said presentation is at least partially aural.

4. The apparatus of claim 1, wherein said presentation spans a first time and a second time, and said content of said one stream and said content of said other stream pertain at said first time to respective first portions of said streams and at said second time to respective second portions of said streams.

5. The apparatus of claim 1, wherein said signal includes control information for controlling processing of said other stream to effect said synchronizing.

6. The apparatus of claim 1, further comprising input means configured for causing a function control command to issue by interactive operation of said input means by a user responding to a rendering of said other stream, said command causing said information characteristic of content of said other stream to be generated.

7. The apparatus of claim 1, wherein said player plays back said content as viewable images derived from said one stream, said playing back producing said viewable images on a display in synchronization with playback on another display of viewable images derived from said other stream.

8. The apparatus of claim 1, wherein said one stream includes image data and has a partially decompressed form before decompression via an image transform that operates on frequency components of image data, said deriving being performed based on said stream in said partially decompressed form without further decompression.

9. The apparatus of claim 1, wherein said deriving occurs prior to said storing of said one stream and wherein said stored stream has embedded tags referencing corresponding portions of said characteristic information.

10. The apparatus of claim 1, wherein said apparatus comprises a personal video recorder.

11. The apparatus of claim 1, further comprising:
    a second stream characteristics unit for deriving said information characteristic of content of the other stream;
    means for forming said signal from said information derived by the second stream characteristics unit; and
    means for outputting said signal.

12. The apparatus of claim 11, further comprising:
    a third stream characteristics unit for deriving information characteristic of content of a third digital bit stream that has renderable content and resides in a third storage medium;
    means for receiving a signal that carries information characteristic of content of said other stream;
    means for comparing said information of the third stream to said information of the other stream;
    a player for progressing forward in said third stream to play back content of said third stream; and
    means for synchronizing said presentation by modifying said progress in said third stream based on said comparison by said means for comparing said information of the third stream.

13. The apparatus of claim 1, wherein said characteristic information is a watermark.

14. The apparatus of claim 1, wherein said characteristic information is a textual tag.

15. The apparatus of claim 1, wherein said characteristic information is a digital signature.

16. The apparatus of claim 1, wherein said modifying comprises modifying a direction of said progress.

17. The apparatus of claim 1, wherein said modifying comprises modifying a magnitude of said progress.

18. The apparatus of claim 1, wherein an output of said comparison by said comparing means is a count of intraframe coded frames.

19. The apparatus of claim 1, further comprising a player for progressing forward in said other stream to play back content of said other stream;
    wherein said means for synchronizing said presentation modifies said progress in said other stream based on said comparison by said comparing means.

20. The apparatus of claim 1, wherein said modifying fast forwards said playback.

21. The apparatus of claim 20, further comprising a video timer that keeps a time count in correspondence with said playback, wherein said fast forwarding is to a point in said playback that corresponds with a predetermined value of said time count.

22. The apparatus of claim 1, wherein said modifying rewinds said playback.

23. The apparatus of claim 1, wherein said modifying halts said playback.

24. The apparatus of claim 1, wherein said modifying includes a combination of modifications selected from the group consisting of: fast forwarding, rewinding, slowing down and halting said playback.

25. A method for synchronizing presentation of renderable content of at least two digital bit streams that reside in respective storage media comprising the steps of:
    deriving information characteristic of content of one of said streams;
    comparing said information to information characteristic of content of the other stream;
    progressing forward in said one stream to play back content of said one stream; and synchronizing said presentation by modifying said progress based on said comparison by said comparing means.

26. The method of claim 25, further comprising before said deriving step the step of including in said streams image data so that said presentation is at least partially visual.

27. The method of claim 25, further comprising before said deriving step the step of including in said streams audio data so that said presentation is at least partially aural.

28. The method of claim 25, wherein said presentation spans a first time and a second time, and said content of said one stream and said content of said other stream pertain at said first time to respective first portions of said streams and at said second time to respective second portions of said streams.

29. The method of claim 25, further comprising the step of including in said signal control information for controlling processing of said one stream to effect said synchronizing.

30. The method of claim 25, further comprising the step of providing input means configured for causing a function control command to issue by interactive operation of said input means by a user responding to a rendering of said other stream, said command causing said information characteristic of content of said other stream to be generated.

31. The method of claim 25, wherein said content is played back in said progressing step as viewable images derived from said one stream, said playing back producing said viewable images in synchronization with playback of viewable images derived from said other stream.

32. The method of claim 25, wherein said one stream includes image data and has a partially decompressed form before decompression via an image transform that operates on frequency components of image data, said method further including before said deriving step the step of partially decompressing said one stream to said partially decompressed form, and wherein said deriving step is performed based on said stream in said partially decompressed form without further decompression.

33. A method for synchronizing presentation of renderable content of two or more digital bit streams that reside in respective storage media, said content being played back by progressing forward in said two or more streams, comprising the steps of:

receiving one of said digital bit streams;
deriving information characteristic of content of said received stream;
outputting a signal carrying the derived information;
receiving said signal;
comparing characteristic information in said received signal to respective information characteristic of content of one or more of said digital bit streams other than said received stream; and
synchronizing said presentation by modifying said progress of said respective playbacks based on said one or more comparisons.

34. A computer-readable medium, having stored thereon, a computer program which program when read by a computer causes the computer to perform synchronizing presentation of renderable content of at least two digital bit streams that reside in respective storage media, said program comprising:

instruction means deriving information characteristic of content of one of said streams;
instruction means for comparing said information to information characteristic of content of the other stream;
instruction means for progressing forward in said one stream to play back content of said one stream; and
instruction means for synchronizing said presentation by modifying said progress based on said comparison by said instruction means for comparing.

35. An apparatus for synchronizing presentation of renderable content of at least two digital bit streams that reside in respective storage media, said apparatus comprising:

a stream characteristic unit for deriving information characteristic of content of one of said streams;
means for receiving a signal that carries information characteristic of content of the other stream;
means for comparing said information of said one stream to said information of the other stream;
means for progressing forward in said one stream to play back content of said one stream; and
means for synchronizing said presentation by modifying said progress based on said comparison by said comparing means.

* * * * *